US011361425B2

(12) United States Patent
Lu et al.

(10) Patent No.: US 11,361,425 B2
(45) Date of Patent: Jun. 14, 2022

(54) METHOD FOR DYNAMICALLY MONITORING CONTENT OF RARE EARTH ELEMENT COMPONENT BASED ON TIME-SERIES FEATURE

(71) Applicant: East China Jiaotong University, Nanchang (CN)

(72) Inventors: Rongxiu Lu, Nanchang (CN); Mingming Chen, Nanchang (CN); Hui Yang, Nanchang (CN); Jianyong Zhu, Nanchang (CN); Gang Yang, Nanchang (CN)

(73) Assignee: EAST CHINA JIAOTONG UNIVERSITY, Nanchang (CN)

( * ) Notice: Subject to any disclaimer, the term of this patent is extended or adjusted under 35 U.S.C. 154(b) by 26 days.

(21) Appl. No.: 17/107,918

(22) Filed: Nov. 30, 2020

(65) Prior Publication Data
US 2022/0028050 A1 Jan. 27, 2022

(30) Foreign Application Priority Data

Jul. 22, 2020 (CN) .......................... 202010708783.4

(51) Int. Cl.
| | |
|---|---|
| G06T 7/00 | (2017.01) |
| G06T 7/90 | (2017.01) |
| G06V 10/28 | (2022.01) |
| G06K 9/62 | (2022.01) |

(52) U.S. Cl.
CPC .......... *G06T 7/0004* (2013.01); *G06K 9/6232* (2013.01); *G06K 9/6289* (2013.01); *G06T 7/90* (2017.01); *G06V 10/28* (2022.01); *G06T 2207/20221* (2013.01); *G06T 2207/30136* (2013.01); *G06T 2207/30181* (2013.01)

(58) Field of Classification Search
CPC ................... G06T 7/0004; G06T 7/90; G06T 2207/20221; G06T 2207/30136; G06T 2207/30181; G06T 7/001; G06K 9/6232; G06K 9/6289; G06K 9/6215; G06K 9/6247; G06V 10/28
See application file for complete search history.

(56) References Cited

U.S. PATENT DOCUMENTS

| | | | | |
|---|---|---|---|---|
| 2009/0087026 | A1* | 4/2009 | Xie ........................ | G01N 23/04 382/103 |
| 2015/0071538 | A1* | 3/2015 | Marchisio .............. | G06V 10/40 382/206 |

* cited by examiner

*Primary Examiner* — Christopher M Brandt
(74) *Attorney, Agent, or Firm* — Fredrikson & Byron, P.A.

(57) ABSTRACT

The disclosure discloses a method for dynamically monitoring the content of a rare earth element (REE) component based on a time-series feature. Using an image information acquisition device to periodically acquire a time-series image of a rare earth (RE) solution to be monitored; extracting a time-series feature of the time-series image in a mixed color space; determining whether a time-series feature value of the time-series image is in an expected interval of the mixed color space; calculating a histogram intersection distance between the time-series image and a sample image in a sample data set in the HSV color space, and determining the content of the REE component corresponding to the time-series image according to a component content corresponding to a sample image with a larger histogram intersection distance, if the determination result indicates no; otherwise, directly waiting for the acquisition of a time-series image at a next sampling time point.

6 Claims, 5 Drawing Sheets

METHOD FOR DYNAMICALLY MONITORING CONTENT OF RARE EARTH ELEMENT COMPONENT BASED ON TIME-SERIES FEATURE

RELATED APPLICATIONS

This application claims priority to Chinese Patent Application No. 202010708783.4, filed Jul. 22, 2020, the entire contents of which are incorporated herein by reference.

TECHNICAL FIELD

The disclosure relates to the technical field of rare earth element (REE) component content monitoring, in particular to a method for dynamically monitoring the content of an REE component based on a time-series feature.

BACKGROUND

Rare earth elements (REEs) are a group of 17 elements such as lanthanides, scandium and yttrium, which tend to occur in the same ore deposit. In order to obtain a single element that meets the standard from the rare earth (RE) deposit, RE companies usually use the solvent cascade extraction method. During the RE cascade extraction process, due to the unique electronic layer structure of the REE, some ions of the REE have an absorption peak in the visible light region and show a featuring color. Therefore, some scholars have applied the color feature to the rapid detection of the content of the REE component.

However, in application, the existing REE detection based on the color feature needs to determine the component content of the RE solution every time, which occupies the memory space and takes time.

SUMMARY

The disclosure aims to provide a method for dynamically monitoring the content of a rare earth element (REE) based on a time-series feature. The disclosure overcomes the technical defects of the existing REE detection method based on the color feature, and reduces the calculation amount and calculation time.

To achieve the above purpose, the disclosure provides the following technical solutions:

A method for dynamically monitoring the content of a rare earth element (REE) component based on a time-series feature is provided, where the monitoring method includes the following steps:

collecting sample solutions in different periods under different working conditions at a rare earth (RE) production site; obtaining a component content of each sample solution through an offline laboratory test; obtaining a sample image of each sample solution through an image information acquisition device; establishing a sample data set that includes the component content and sample image of each sample solution;

determining a weight of a hue, saturation and intensity (HSI) color space and a weight of a YUV color space for color space fusion based on the sample data set;

determining an expected interval of a mixed color space according to the weight of the HSI color space and the weight of the YUV color space based on the sample data set;

using the image information acquisition device to periodically acquire a time-series image of the RE solution to be monitored;

extracting a time-series feature of the time-series image by using a principal component analysis (PCA) method in the mixed color space according to the weight of the HSI color space and the weight of the YUV color space, to obtain a time-series feature value of the time-series image;

determining whether the time-series feature value of the time-series image is in the expected interval of the mixed color space, to obtain a determination result;

calculating a histogram intersection distance between the time-series image and the sample image in the sample data set in a hue, saturation and value (HSV) color space, determining the content of the REE component corresponding to the time-series image according to a component content corresponding to a sample image with a larger histogram intersection distance, returning to the step of "using the image information acquisition device to periodically acquire a time-series image of the RE solution to be monitored", and waiting for the acquisition of a time-series image at a next sampling time point, if the determination result indicates no; and returning to the step of "using the image information acquisition device to periodically acquire a time-series image of the RE solution to be monitored", and waiting for the acquisition of a time-series image at a next sampling time point, if the determination result indicates yes.

Optionally, the determining a weight of an HSI color space and a weight of a YUV color space for color space fusion based on the sample data set specifically includes:

converting the sample image of each sample solution from a red, green and blue (RGB) color space to the HSI color space and the YUV color space, to obtain a sample image of each sample solution in the HSI color space and a sample image thereof in the YUV color space;

performing feature extraction on the sample image in the HSI color space and the sample image in the YUV color space respectively through the PCA method to obtain a feature value of the sample image of each sample solution in the HSI color space and a feature value of the sample image of each sample solution in the YUV color space;

performing least squares fitting (LSF) on the feature value of the sample image of each sample solution in the HSI color space and the feature value of the sample image of each sample solution in the YUV color space with the component content of each sample solution respectively, to obtain a relationship model between the HSI color space feature value and the component content and a relationship model between the YUV color space feature value and the component content;

using the relationship model between the HSI color space feature value and the component content and the relationship model between the YUV color space feature value and the component content respectively to determine a feature value interval corresponding to a component content interval under an optimal working condition as an expected interval in the HSI color space and as an expected interval in the YUV color space;

determining a working condition of the sample solution by using the feature value of the sample image of each sample solution in the HSI color space and the feature value of the sample image of each sample solution in the YUV color space based on the expected interval in the HSI color space and the expected interval in the YUV color space respectively, to obtain an accuracy of the determination based on the HSI color space and an accuracy of the determination based on the YUV color space; and normalizing the accuracy of the determination based on the HSI color space and the accuracy of the determination based on the YUV color space respectively, to obtain a normalized accuracy of the determination based on the HSI color space and a normalized accuracy of the determination based on the YUV color space, which serve as a weight of the HSI color space and a weight of the YUV color space, respectively.

Optionally, the determining an expected interval of a mixed color space according to the weight of the HSI color space and the weight of the YUV color space based on the sample data set specifically includes:

converting the sample image of each sample solution from the RGB color space to the HSI color space and the YUV color space, to obtain a sample image of each sample solution in the HSI color space and a sample image thereof in the YUV color space;

fusing the sample image in the HSI color space and the sample image in the YUV color space according to an image fusion formula $$\begin{cases} \mu_{MIX-1} = \mu_{HSI-H} \\ \mu_{MIX-2} = \mu_{HSI-S} \\ \mu_{MIX-3} = \dfrac{[W_{HSI} \times \mu_{HSI-I} + W_{YUV} \times \mu_{YUV-Y}]}{W_{HSI} + W_{YUV}} \end{cases}$$

based on the weight of the HSI color space and the weight of the YUV color space, to obtain a sample image in the mixed color space;

where, $\mu_{MIX-1}$, $\mu_{MIX-2}$ and $\mu_{MIX-3}$ respectively represent a value of a first-order moment of a hue component, a saturation component and a value component in the mixed color space; $\mu_{HSI-H}$, $\mu_{HSI-S}$ and $\mu_{HSI-I}$ respectively represent a value of a first-order moment of H, S and I components in the HSI color space; $\mu_{YUV-Y}$ represents a value of a first-order moment of a Y component in the YUV color space;

$$\mu_x = \frac{1}{N}\sum_{y=1}^{N} P_{xy},$$

where $P_{xy}$ represents a value of a first-order moment of an x-th component of a y-th pixel in the image; x is equal to HSI-H, HSI-S, HSI-I and YUV-Y; N represents a number of pixels in the sample image; $W_{HSI}$ and $W_{YUV}$ respectively represent the weight of the HSI color space and the weight of the YUV color space;

performing feature extraction on the sample image in the mixed color space through the PCA method to obtain a feature value of the sample image of each sample solution in the mixed color space;

performing LSF on the feature value of the sample image of each sample solution in the mixed color space with the component content of the sample solution, to obtain a relationship model between the mixed color space feature value and the component content; and using the relationship model between the mixed color space feature value and the component content to determine a feature value interval corresponding to a component content interval under an optimal working condition as an expected interval in the mixed color space.

Optionally, the extracting a time-series feature of the time-series image by using a PCA method in the mixed color space according to the weight of the HSI color space and the weight of the YUV color space, to obtain a time-series feature value of the time-series image specifically includes:

converting the time-series image from the RGB color space to the HSI color space and the YUV color space, to obtain a time-series image in the HSI color space and a time-series image in the YUV color space;

fusing the time-series image in the HSI color space and the time-series image in the YUV color space according to an image fusion formula based on the weight of the HSI color space and the weight of the YUV color space, to obtain a time-series image in the mixed color space;

performing feature extraction on the time-series image in the mixed color space through the PCA method to obtain a time-series feature value of the time-series image.

Optionally, the calculating a histogram intersection distance between the time-series image and the sample image in the sample data set in a HSV color space, and determining the content of the REE component corresponding to the time-series image according to a component content corresponding to a sample image with a larger histogram intersection distance specifically includes:

combining a hue component, a saturation component and a value component of the HSV color space of the time-series image into a one-dimensional (1D) feature vector according to G(Q)=16$H_i$+4$S_i$+$V_i$, to obtain an quantization index of each pixel of the time-series image, where G(i) represents a quantization index of an i-th pixel of the time-series image; $H_i$, $S_i$ and $V_i$ respectively represent a hue component, a saturation component and a value component of the HSV color space of the i-th pixel of the time-series image;

calculating a histogram intersection distance between the time-series image and each image sample in the sample data set according to $$\rho(G, G'_j) = \sum_{i=1}^{N} \sqrt{G(i)G'_j(i)}$$

based on the quantization index of each pixel of the time-series image, where $\rho(G,G_j')$ represents a histogram intersection distance between the time-series image and a j-th sample image in the data sample set; N represents a number of pixels in the time-series image; $G_j'(i)$ represents a quantization index of an i-th pixel of the j-th sample image in the sample data set; and calculating an average value of the component content of an image sample with a larger histogram intersection distance as the content of the REE component of the time-series image.

Optionally, before extracting a time-series feature of the time-series image by using a PCA method in the mixed color space according to the weight of the HSI color space and the weight of the YUV color space, to obtain a time-series feature value of the time-series image, the monitoring method further includes:

performing background segmentation, filtering and center area extraction on the time-series image to obtain a processed time-series image.

According to the specific examples provided by the disclosure, the disclosure discloses the following technical effects.

The disclosure discloses a method for dynamically monitoring the content of an REE component based on a time-series feature. The monitoring method includes: using an image information acquisition device to periodically acquire a time-series image of a rare earth (RE) solution to be monitored; extracting a time-series feature of the time-series image in a mixed color space by using a principal component analysis (PCA) method according to a weight of a hue, saturation and intensity (HSI) color space and a weight of a YUV color space; determining whether a time-series feature value of the time-series image is in an expected interval of the mixed color space, to obtain a determination result; calculating a histogram intersection distance between the time-series image and a sample image in a sample data set in a hue, saturation and value (HSV) color space, and determining the content of the REE component corresponding to the time-series image according to a component content corresponding to a sample image with a larger histogram intersection distance, if the determination result indicates no; adjusting a process parameter of an RE extraction process according to the content of the REE component corresponding to the time-series image; directly waiting for the acquisition of a time-series image at a next sampling time point without determining the component content, if the determination result indicates yes. The monitoring method does not need to calculate the component content according to the time-series image at each acquisition, reducing the calculation amount and calculation time.

BRIEF DESCRIPTION OF THE DRAWINGS

To describe the technical solutions in the examples of the disclosure or in the prior art more clearly, the accompanying drawings required for the examples are briefly described below. Apparently, the accompanying drawings in the following description show merely some examples of the disclosure, and a person of ordinary skill in the art may still derive other accompanying drawings from these accompanying drawings without creative efforts.

DETAILED DESCRIPTION

An objective of the disclosure is to provide a method for dynamically monitoring the content of a rare earth element (REE) based on a time-series feature. The disclosure overcomes the technical defects of the existing REE detection method based on the color feature, and reduces the calculation amount and calculation time.

In order to make the above objectives, features and advantages of the disclosure more understandable, the disclosure will be described in further detail below with reference to the accompanying drawings and detailed examples.

Figure 2:
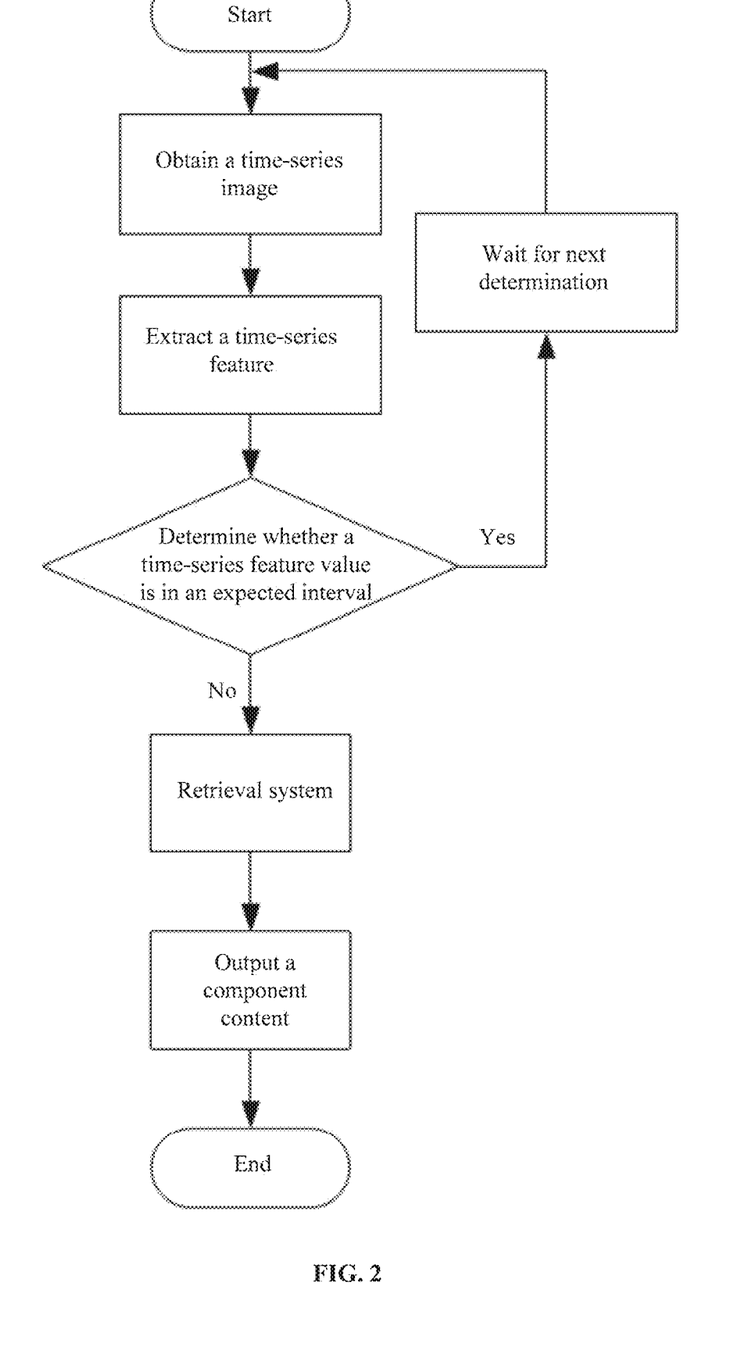
FIG. 2 is a schematic diagram of the method for dynamically monitoring the content of an REE component based on a time-series feature according to the disclosure.

As shown in FIG. 2, an image information acquisition device is first used to periodically acquire a time-series image of a rare earth (RE) solution. Then, in a mixed color space, a time-series feature of the time-series image is extracted by performing principal component analysis (PCA) and least square fitting (LSF) to obtain an expected interval. It is determined whether a time-series feature value of the image to be monitored is in the expected interval. If yes, the determination of a next time-series image is waited for without adjusting a process parameter of an RE extraction process. If not, an image retrieval system is started (to determine a component content in the RE mixed solution). In a hue, saturation and value (HSV) color space, a Bhattacharyya coefficient is used to calculate a histogram intersection distance of the image to determine the similarity of the image to be monitored. A solution image with a high similarity is selected to calculate an average value of the corresponding component content, to realize the prediction of the component content of the RE mixed solution.

Figure 1:
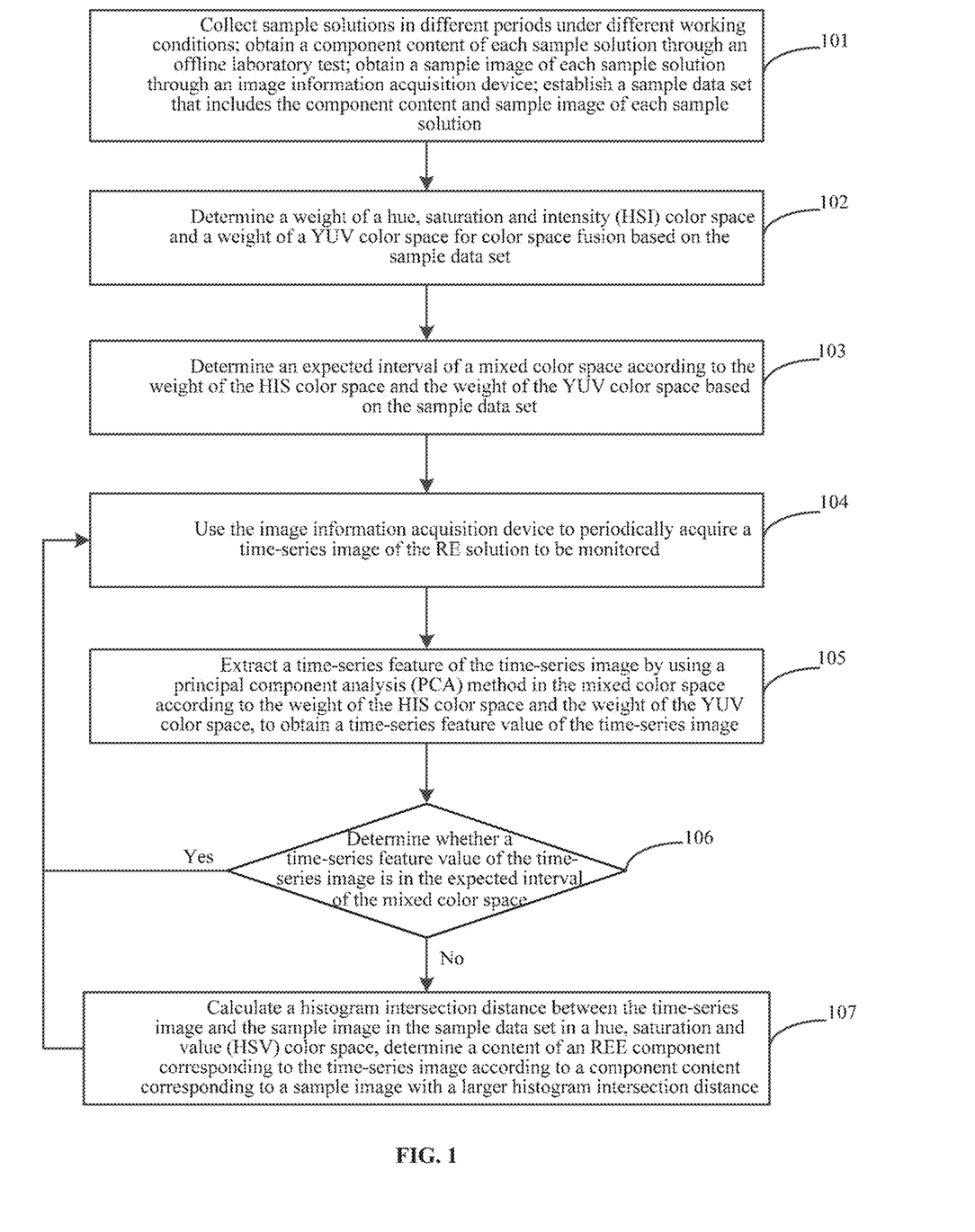
FIG. 1 is a flowchart of a method for dynamically monitoring the content of a rare earth element (REE) component based on a time-series feature according to the disclosure.

As shown in FIG. 1, the method for dynamically monitoring the content of an REE component based on a time-series feature provided by the disclosure includes the following steps:

Step 101: Collect sample solutions in different periods under different working conditions at an RE production site; obtain a component content of each sample solution through an offline laboratory test; obtain a sample image of each sample solution through an image information acquisition device; establish a sample data set that includes the component content and sample image of each sample solution.

Sample solutions were collected under different working conditions at different times at the production site of an RE company. Each sample was divided into two parts, one part was used for an offline laboratory test to obtain an element component content of the sample solution, and the other part was sent to an RE solution image information acquisition device based on machine vision (MV) to obtain an image of the mixed solution. Then, background segmentation, image filtering, and center area extraction were performed on the image to obtain a square image with a trimmed size of 128×128. On this basis, an optimal time-series feature of the solution image was extracted.

Step 102: Determine a weight of the HSI color space and a weight of a YUV color space for color space fusion based on the sample data set.

The weight of the HSI color space and the weight of the YUV color space are determined after normalization of an accuracy tested by a time-series feature threshold in the single color space. Specifically, the weight of the HSI color space and the weight of the YUV color space are determined as follows: use first-order moments of three color components of the HSI and YUV color spaces respectively, and perform PCA dimensionality reduction and LSF, to obtain an expected interval of a time-series feature of a solution image corresponding to an interval of a monitoring stage component content under an optimal working condition in the single color space; obtain an accuracy of determination of a working condition; and normalize the accuracy of determination of the working condition obtained in the two single color spaces respectively, so as to determine an optimal weight of the two different color spaces.

In step 102, the determining a weight of an HSI color space and a weight of a YUV color space for color space fusion based on the sample data set specifically includes: convert the sample image of each sample solution from a red, green and blue (RGB) color space to the HSI color space and the YUV color space, to obtain a sample image of each sample solution in the HSI color space and a sample image thereof in the YUV color space; perform feature extraction on the sample image in the HSI color space and the sample image in the YUV color space respectively through the PCA method to obtain a feature value of the sample image of each sample solution in the HSI color space and a feature value of the sample image of each sample solution in the YUV color space; perform LSF on the feature value of the sample image of each sample solution in the HSI color space and the feature value of the sample image of each sample solution in the YUV color space with the component content of each sample solution respectively, to obtain a relationship model between the HSI color space feature value and the component content and a relationship model between the YUV color space feature value and the component content; use the relationship model between the HSI color space feature value and the component content and the relationship model between the YUV color space feature value and the component content respectively to determine a feature value interval corresponding to a component content interval under an optimal working condition as an expected interval in the HSI color space and as an expected interval in the YUV color space; determine a working condition of the sample solution by using the feature value of the sample image of each sample solution in the HSI color space and the feature value of the sample image of each sample solution in the YUV color space based on the expected interval in the HSI color space and the expected interval in the YUV color space respectively, to obtain an accuracy of the determination based on the HSI color space and an accuracy of the determination based on the YUV color space; and normalize the accuracy of the determination based on the HSI color space and the accuracy of the determination based on the YUV color space respectively, to obtain a normalized accuracy of the determination based on the HSI color space and a normalized accuracy of the determination based on the YUV color space, which serve as a weight of the HSI color space and a weight of the YUV color space, respectively.

Step 103: Determine an expected interval of a mixed color space according to the weight of the HSI color space and the weight of the YUV color space based on the sample data set.

Spatial color fusion is performed according to the weight of the HSI color space and the weight of the YUV color space. For the three components of the mixed color space, PCA dimensionality reduction and LSF are also performed, to obtain an interval of a time-series feature threshold of a solution image of a monitoring stage extraction tank under an optimal working condition in the mixed color space, which serves as an expected interval of the mixed color space.

In step 103, the determining an expected interval of a mixed color space according to the weight of the HSI color space and the weight of the YUV color space based on the sample data set specifically includes: convert the sample image of each sample solution from an RGB color space to the HSI color space and the YUV color space, to obtain a sample image of each sample solution in the HSI color space and a sample image thereof in the YUV color space; fuse the sample image in the HSI color space and the sample image in the YUV color space according to an image fusion formula $$\begin{cases} \mu_{MIX-1} = \mu_{HSI-H} \\ \mu_{MIX-2} = \mu_{HSI-S} \\ \mu_{MIX-3} = \dfrac{[W_{HSI} \times \mu_{HSI-I} + W_{YUV} \times \mu_{YUV-Y}]}{W_{HSI} + W_{YUV}} \end{cases}$$

based on the weight of the HSI color space and the weight of the YUV color space, to obtain a sample image in the mixed color space, where, $\mu_{MIX-1}$, $\mu_{MIX-2}$ and $\mu_{MIX-3}$ respectively represent a value of a first-order moment of a hue component, a saturation component and a value component in the mixed color space; $\mu_{HSI-H}$, $\mu_{HSI-S}$ and $\mu_{HSI-I}$ respectively represent a value of a first-order moment of H, S and I components in the HSI color space; $\mu_{YUV-Y}$ represents a value of a first-order moment of a Y component in the YUV color space;

$$\mu_x = \frac{1}{N} \sum_{y=1}^{N} P_{xy},$$

where $P_{xy}$ represents a value of a first-order moment of an x-th component of a y-th pixel in the image; x is equal to HSI-H, HSI-S, HSI-I and YUV-Y; N represents a number of pixels in the sample image; $W_{HSI}$ and $W_{YUV}$ respectively represent the weight of the HSI color space and the weight of the YUV color space; perform feature extraction on the sample image in the mixed color space through the PCA method to obtain a feature value of the sample image of each sample solution in the mixed color space; perform LSF on the feature value of the sample image of each sample solution in the mixed color space with the component content of the sample solution, to obtain a relationship model between the mixed color space feature value and the component content; and use the relationship model between the mixed color space feature value and the component content to determine a feature value interval corresponding to a component content interval under an optimal working condition as an expected interval in the mixed color space.

Step 104: Use the image information acquisition device to periodically acquire a time-series image of the RE solution to be monitored.

Step 105: Extract a time-series feature of the time-series image by using a PCA method in the mixed color space according to the weight of the HSI color space and the weight of the YUV color space, to obtain a time-series feature value of the time-series image.

In order to avoid the one-sidedness of a single color model, a multi-color-space fusion method is used to describe the time-series feature, so as to obtain optimal feature components of the REE in the mixed solution image. First, according to formulas (1) and (2), a processed time-series image trimmed into a 128×128 square is converted from the RGB color space to the HSI and YUV color spaces. Then, according to formula (3), the first-order moments of the brightness components of the HSI and YUV color spaces are fused to obtain a first-order moment of the brightness component of the mixed color space. Since the description of the chroma in the YUV color space is not accurate, the hue component and saturation component of the mixed color space only use H and S vectors of the HSI color space.

$$\begin{cases} H = \begin{cases} \theta & B \leq G \\ 360 - \theta & B > G \end{cases} \\ \theta = \arccos\left\{ \dfrac{\frac{1}{2}[(R-G)-(R-B)]}{[(R-G)^2 + (R-G)(G-B)]^{1/2}} \right\} \\ S = 1 - \dfrac{3}{(R+G+B)}[\min(R, G, B)] \\ I = \dfrac{1}{3}(R+G+B) \end{cases} \quad (1)$$

$$\begin{bmatrix} Y \\ U \\ V \end{bmatrix} = \begin{bmatrix} 0.299 & 0.578 & 0.114 \\ -0.1687 & -0.3314 & 0.5 \\ -0.5 & -0.4187 & -0.0813 \end{bmatrix} \begin{bmatrix} R \\ G \\ B \end{bmatrix} + \begin{bmatrix} 0 \\ 128 \\ 128 \end{bmatrix} \quad (2)$$

$$\mu_{MIX-3} = \frac{[W_{HSI} \times \mu_{HSI-I} + W_{YUV} \times \mu_{YUV-Y}]}{W_{HSI} + W_{YUV}} \quad (3)$$

In step 105, the extracting a time-series feature of the time-series image by using a PCA method in the mixed color space according to the weight of the HSI color space and the weight of the YUV color space, to obtain a time-series feature value of the time-series image specifically includes:

Convert the time-series image from the RGB color space to the HSI color space and the YUV color space according to formulas (1) and (2), to obtain a time-series image in the HSI color space and a time-series image in the YUV color space.

Fuse the time-series image in the HSI color space and the time-series image in the YUV color space according to an image fusion formula based on the weight of the HSI color space and the weight of the YUV color space, to obtain a time-series image in the mixed color space.

Perform feature extraction on the time-series image in the mixed color space through the PCA method to obtain a time-series feature value of the time-series image.

The disclosure introduces the PCA method, which reduces data redundancy and increases the calculation speed. The PCA method is implemented as follows:

Assuming that the acquired time-series image with a trimmed size of 128×128 has a total of m sample points and n parameter variables, then a resulting sample set matrix $X_{m \times n}$, is as follows:

$$X_{m \times n} = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}_{m \times n} \quad (4)$$

Each row represents a value of a first-order moment of different color components at a certain time at each measuring point, and each column represents a value of a first-order moment of the same color component at a certain measuring point at different times.

Step 1: Perform Z-score standardization on the sample set matrix $X_{m \times n}$ to obtain a standardized sample set matrix Z.

$$z_{ij} = x_{ij}^* = \frac{x_{ij} - \overline{x}_j}{s_j}, \ i = 1, 2, \ldots, m, \ j = 1, 2, \ldots, n \quad (5)$$

In the equation, $$\overline{x}_j = \frac{1}{m}\sum_{i=1}^{m} x_{ij}$$

represents a mean of each column of the matrix $X_{m \times n}$, and $$s_j = \sqrt{\frac{1}{m-1}\sum_{i=1}^{m}(x_{ij} - \overline{x}_j)^2}$$

represents a standard deviation of each column of the matrix $X_{m \times n}$.

The resulting standardized sample set matrix Z is:

$$Z = \begin{bmatrix} z_{11} & z_{12} & \cdots & z_{1n} \\ z_{21} & z_{22} & \cdots & z_{2n} \\ \cdots & \cdots & \cdots & \cdots \\ z_{m1} & z_{m2} & \cdots & z_{mn} \end{bmatrix}_{m \times n} \quad (6)$$

Step 2: Calculate a correlation matrix R of Z according to formula (7).

$$r_{kl} = \frac{s_{kl}}{s_k s_l} = \frac{\sum_{k=1}^{n}(z_{kl} - \overline{z}_k)(z_{kl} - \overline{z}_l)}{\sqrt{\sum_{k=1}^{n}(z_{kl} - \overline{z}_k)\sum_{k=1}^{n}(z_{kl} - \overline{z}_l)}} \quad (7)$$

In the formula, $$\overline{z}_k = \frac{1}{m}\sum_{i=1}^{m} x_{ik}, \ \overline{z}_l = \frac{1}{m}\sum_{i=1}^{m} x_{il};$$

k and l represent a k-th column and a $1^{st}$ column in the matrix Z respectively; $r_{kl} = r_{lk}$, l=1, 2 . . . n.

The resulting correlation matrix R is as follows:

$$R = \begin{bmatrix} r_{11} & r_{12} & \cdots & r_{1n} \\ r_{21} & r_{22} & \cdots & r_{2n} \\ \cdots & \cdots & \cdots & \cdots \\ r_{m1} & r_{m2} & \cdots & r_{mn} \end{bmatrix}_{m \times n} \quad (8)$$

Step 3: Calculate eigenvalues A, and eigenvectors V of the correlation matrix R.

Step 4: Arrange the eigenvectors v in columns according to a descending order of the eigenvalues; take first k columns of eigenvectors to form a matrix P; calculate a contribution rate $c_j$ and a cumulative contribution rate $C_k$ of each eigenvector of the matrix P.

$$c_j = \lambda_j \Big/ \sum_{j=1}^{n} \lambda_j, \ C_k = \sum_{j=1}^{k} \lambda_j \Big/ \sum_{j=1}^{n} \lambda_j \quad (9)$$

In the formula, k (k<n) represents first k principal components.

Step 5: Calculate according to formula (10) to obtain a matrix Y, which is the data after the matrix $X_{m \times n}$ is reduced to k dimensions, that is, an extracted time-series feature value.

$$Y = ZP \qquad (10)$$

When $C_k \geq 85\%$ in engineering, it can be considered that the first k principal components retain most of the information of the original data, and the retained information is the color feature component after dimensionality reduction.

After the PCA is performed, an LSF algorithm is used, and a model between the new feature variable Y and the component content after the PCA processing is established according to formula (10). This model is used to calculate with the interval $(x_1, x_2)$ of a certain monitoring stage component content, to obtain a threshold interval $[f(x_1), f(x_2)]$ for determining an optimal working condition. The relationship model may be expressed as equation (11).

$$f(x) = \sum_{i=1}^{k} a_i x^i + a_0 \qquad (11)$$

In the equation, f(•) represents the new feature variable value after fitting, x represents a value of the component content, k represents an order of the fitting polynomial, $a_i$ represents a coefficient of the corresponding $x^i$ term in the fitting polynomial, and $a_0$ represents a constant term.

Step 106: Determine whether a time-series feature value of the time-series image is in the expected interval of the mixed color space, to obtain a determination result.

Step 107: Calculate a histogram intersection distance between the time-series image and the sample image in the sample data set in an HSV color space, determine the content of the REE component corresponding to the time-series image according to a component content corresponding to a sample image with a larger histogram intersection distance, and return to the step of "using the image information acquisition device to periodically acquire a time-series image of the RE solution to be monitored", if the determination result indicates no.

In step 107, the calculating a histogram intersection distance between the time-series image and the sample image in the sample data set in a HSV color space, and determining the content of the REE component corresponding to the time-series image according to a component content corresponding to a sample image with a larger histogram intersection distance specifically includes: combine a hue component, a saturation component and a value component of the HSV color space of the time-series image into a one-dimensional (1D) feature vector according to $G(i) = 16H_i + 4S_i + V_i$, to obtain an quantization index of each pixel of the time-series image, where G(i) represents a quantization index of an i-th pixel of the time-series image; $H_i$, $S_i$ and $V_i$ respectively represent a hue component, a saturation component and a value component of the HSV color space of the i-th pixel of the time-series image; calculating a histogram intersection distance between the time-series image and each image sample in the sample data set according to $$\rho(G, G_j') = \sum_{i=1}^{N} \sqrt{G(i) G_j'(i)}$$

based on the quantization index of each pixel of the time-series image, where $\rho(G, G_j')$ represents a histogram intersection distance between the time-series image and a j-th sample image in the data sample set; N represents a number of pixels in the time-series image; $G_j'(i)$ represents a quantization index of an i-th pixel of the j-th sample image in the sample data set; and calculate an average value of the component content of an image sample with a larger histogram intersection distance as the content of the REE component of the time-series image.

Return to the step of "using the image information acquisition device to periodically acquire a time-series image of the RE solution to be monitored", if the determination result indicates yes.

In the disclosure, the weight and the expected interval are determined as follows:

Step 1: Convert the time-series image from the RGB color space to the HSI and YUV color spaces according to formulas (1) and (2); perform PCA on the three color components in the HSI and YUV color spaces respectively according to formulas (4) to (10); select new principal components $Y_1$ and $Y_2$ to replace the original samples.

Step 2: Establish a relationship between $Y_1$ and $Y_2$ and the component content in the HSI and YUV color spaces respectively by performing LSF according to formula (11); obtain a set value of the interval of a monitoring stage component content under an optimal working condition in the RE extraction process at the extraction production site; obtain two sets of time-series feature thresholds for determining the working condition, and test the accuracy.

Step 3: Normalize the accuracy obtained in Step 2 for determining the working condition as a weight, and then substitute into equation (3) to obtain first-order moments of the three components of the mixed color space, that is, a first-order moment of the hue component and a first-order moment of the saturation component in the HSI color space, and a first-order moment of the brightness component in the mixed color space.

Step 4: Perform PCA on the three components of the mixed color space obtained in Step 3, and obtain a time-series feature $Y_3$ in the mixed color space according to equation (10); then perform LSF to obtain a set value of the interval of a monitoring stage component content under an optimal working condition in the RE extraction process at the extraction production site; and obtain an expected interval of the mixed color space for determining the working condition according to a relationship model between the time-series feature $Y_3$ and the component content, namely formula (11).

As shown in FIG. 2, specifically, the component content is determined by using a retrieval system as follows:

When the time-series feature value of the time-series image monitored in real time exceeds the expected interval, it is necessary to use an RE solution image retrieval algorithm to obtain the value of the element component content.

According to the human eye's ability to distinguish colors, the HSV color space is quantized at non-equal intervals, and the quantization levels of H, S and V are 16, 4 and 4 respectively. Then the H, S, and value components of the HSV color space are synthesized into a 1D feature vector G:

$$G = 16H + 4S + V \qquad (12)$$

According to formula (12), the three color feature components of the HSV color space can all be represented by the vector G, where G is in the range of [0,255]. The quantization index of each pixel is obtained after quantization. In image processing, the Bhattacharyya coefficient can be used for similar image matching. The Bhattacharyya coefficient is used to characterize the image similarity based on the histogram distance as follows:

$$\rho(p, p') = \sum_{i=1}^{N} \sqrt{p(i)p'(i)} \quad (13)$$

In the formula, p, p' respectively represent the probability distribution of two images at the same position on the histogram, and P represents a value of image similarity, which is between 0 and 1. A larger value of P indicates more similar images.

When the feature of the solution image exceeds the time-series feature threshold, the retrieval system is started. According to the value of ρ in formula (13), solution images with a high similarity are selected from a historical image database of the RE mixed solution. An average value of the element component content corresponding to the first two images with the most similar retrieval results is calculated as a detection result of the content of the REE component of the image to be retrieved. Specifically:

Step 1: Input the time-series image to be retrieved.

Step 2: Perform feature extraction according to formula (12) on the image to be retrieved to obtain a quantization index of each pixel of the image to be retrieved, where an image feature is extracted in the form of feature vector and stored in a feature database.

Step 3: Match the quantization index obtained in the above step with a quantization index of a sample image in the feature database; that is, according to formula (13), use a Bhattacharyya coefficient as a similarity measure to calculate a histogram intersection distance between the feature vector of the image to be retrieved and each feature vector in the feature database.

Step 4: Select retrieval result images that meet the requirements from the image database according to the distance calculated in the above step, and sort the images in a descending order of the distance; select the first two images with the most similar retrieval results to calculate an average value of the corresponding component content, and output a predicted value of the component content of the image to be monitored.

The effects of the monitoring method of the disclosure are described below with reference to specific implementations. The disclosure selects the real data at a certain monitoring stage of a mixing tank in a Pr/Nd extraction line of an RE company for a simulation experiment. 90 sample solutions were collected under different working conditions at different times. Each sample was divided into two parts. One part was used for an offline laboratory test to obtain the component content of the sample solution, where the Nd content ranged from 0.01% to 99.965%. The other part was sent to an RE solution image information acquisition device based on MV developed by a laboratory to obtain mixed solution images. FIG. 2 is a flowchart of the method for dynamically monitoring the content of an REE component based on a time-series feature.

In order to use fewer comprehensive indicators to express various types of information existing in different variables, and achieve dimensionality reduction and reconstruction of data, PCA was performed on the basic feature quantities in the two color spaces. The results are shown in Table 1. It can be seen that when the number of principal components selected in the HSI, YUV and mixed color spaces is all 1, the variance contribution rate reaches 92.94%, 96.56% and 92.98%, respectively, which are all greater than 85% required in engineering. This indicates that the first one principal component represents the original data information, reduces redundancy and improves the calculation speed. Therefore, the first one principal element was taken as the modeling variable.

TABLE 1

PCA results in three color spaces

| Color space | Number of principal components | Variance contribution rate/% | Cumulative variance contribution rate/% |
|---|---|---|---|
| HSI | 1 | 92.94 | 92.94 |
|  | 2 | 6.92 | 99.86 |
|  | 3 | 0.14 | 100 |
| YUV | 1 | 96.56 | 96.56 |
|  | 2 | 2.71 | 99.27 |
|  | 3 | 0.73 | 100 |
| Mixed | 1 | 92.98 | 92.98 |
|  | 2 | 6.88 | 99.86 |
|  | 3 | 0.14 | 100 |

Figure 3A:
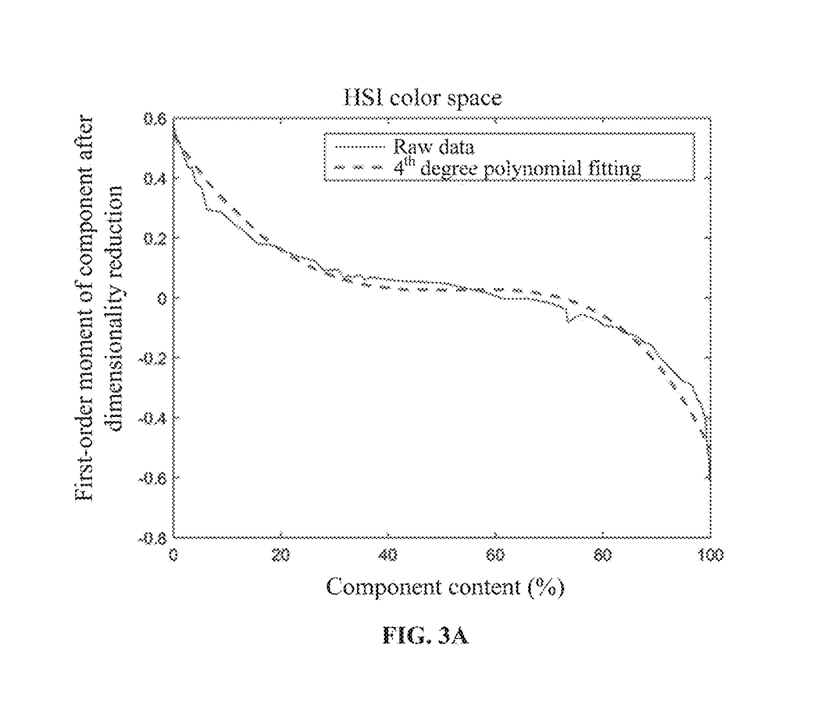
FIG. 3A shows least squares fitting (LSF) curve under a hue, saturation and intensity (HSI) color space according to the disclosure.
Figure 3B:
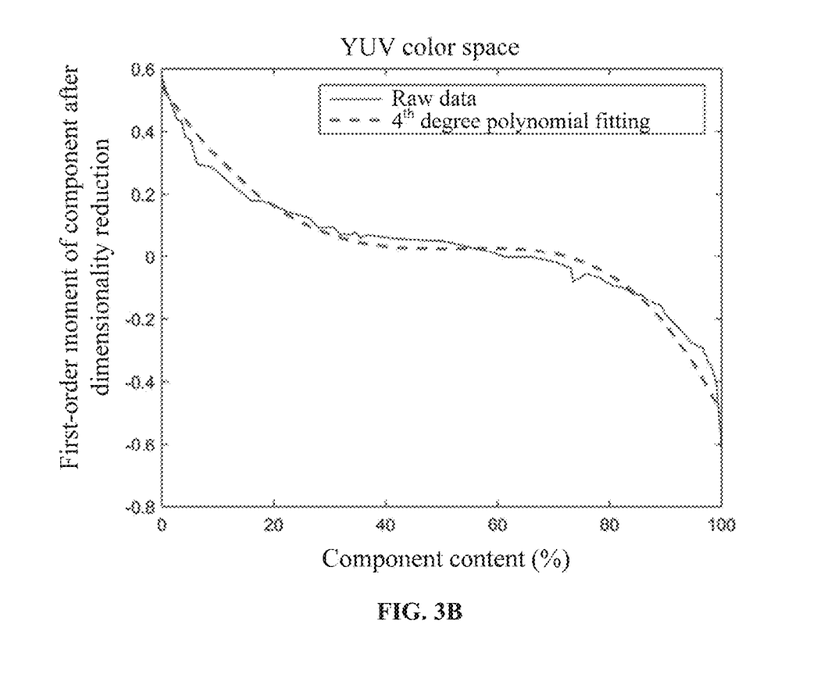
FIG. 3B shows an LSF curve under a YUV color space according to the disclosure.
Figure 3C:
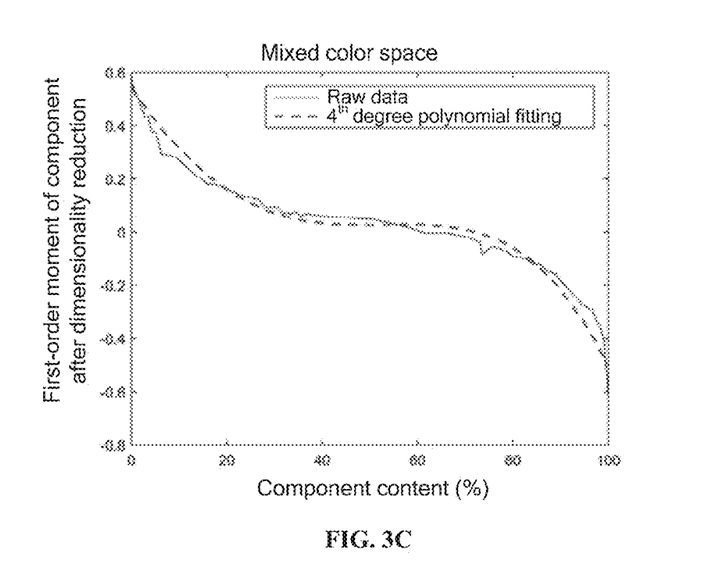
FIG. 3C shows an LSF curve under a mixed color space according to the disclosure.

In this experiment, 70 sets of data were randomly selected from the 90 sets of sample solutions as a training set, and the remaining 20 sets of data were used as a test set to verify the effectiveness of the selected time-series feature threshold. The fitting results and threshold determination results of the three color spaces are shown in FIG. 3 and Table 2. According to the data in FIG. 3 and Table 2, by comparing the three color spaces, it can be seen that the threshold interval obtained under the mixed color space has the highest accuracy in determining the working condition. Since the mixed color space independently fuses the color components with the same attributes and comprehensively considers the color information of the image, it is the best to use the time-series feature threshold of the mixed color space to determine the working condition.

TABLE 2

Threshold determination results of three color spaces

| Color space | HSI | YUV | Mixed |
|---|---|---|---|
| Accuracy | 0.9 | 0.8 | 0.95 |

In order to verify the effectiveness of the image retrieval algorithm based on the HSV color histogram features, the color histogram features of the collected 90 sample solution images were extracted. 80 sample images were randomly selected to construct a historical image feature database, and the remaining 10 sets of images were used as test images. The test results and error analysis results are shown in Table 3. It can be seen from FIG. 3 that the relative errors of the 10 sets of randomly selected test image data are all within 3%, indicating that the detection results of the algorithm meet the accuracy requirements of online detection of the component content.

TABLE 3

Test results and error analysis results

| Rb content in different solutions (%) | Retrieval result (%) | Relative error (%) |
|---|---|---|
| 6.3 | 6.4 | 1.6 |
| 18.0 | 17.9 | 0.6 |
| 21.8 | 21.6 | 0.9 |
| 35.6 | 35.4 | 0.6 |
| 47 | 46.3 | 1.5 |
| 58.6 | 58.9 | 0.5 |
| 68.2 | 69.6 | 2.1 |
| 73.5 | 75.0 | 2.0 |
| 87.4 | 86.7 | 0.8 |
| 94.6 | 95.3 | 0.7 |

Figure 4:
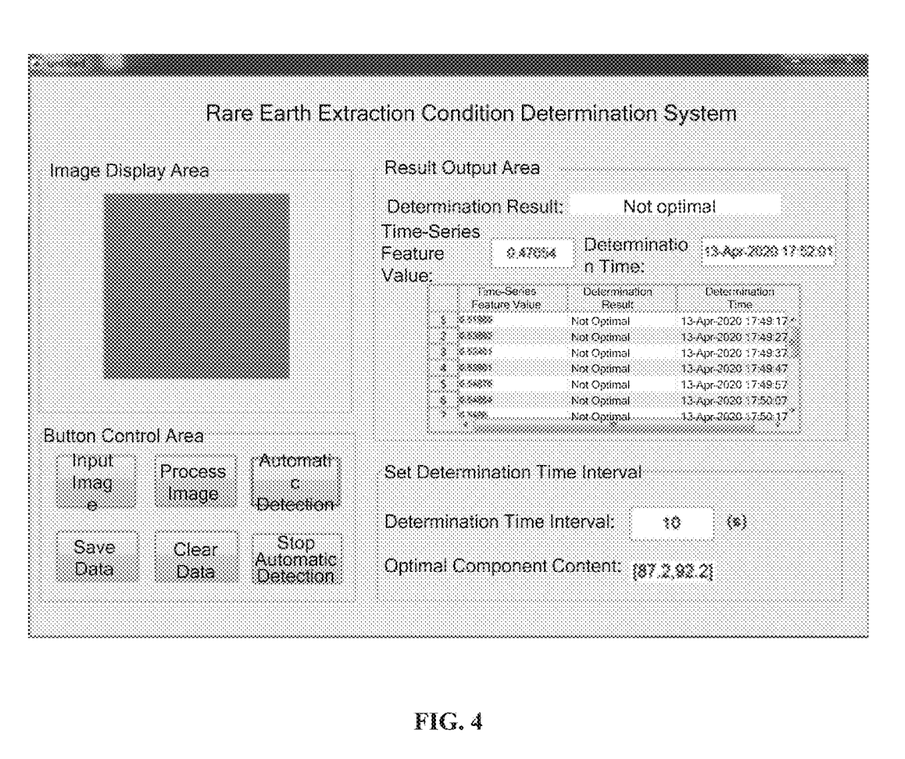
FIG. 4 shows an interface of a working condition determination system of a system for dynamically monitoring the content of an REE component based on a time-series feature according to the disclosure.
Figure 5:
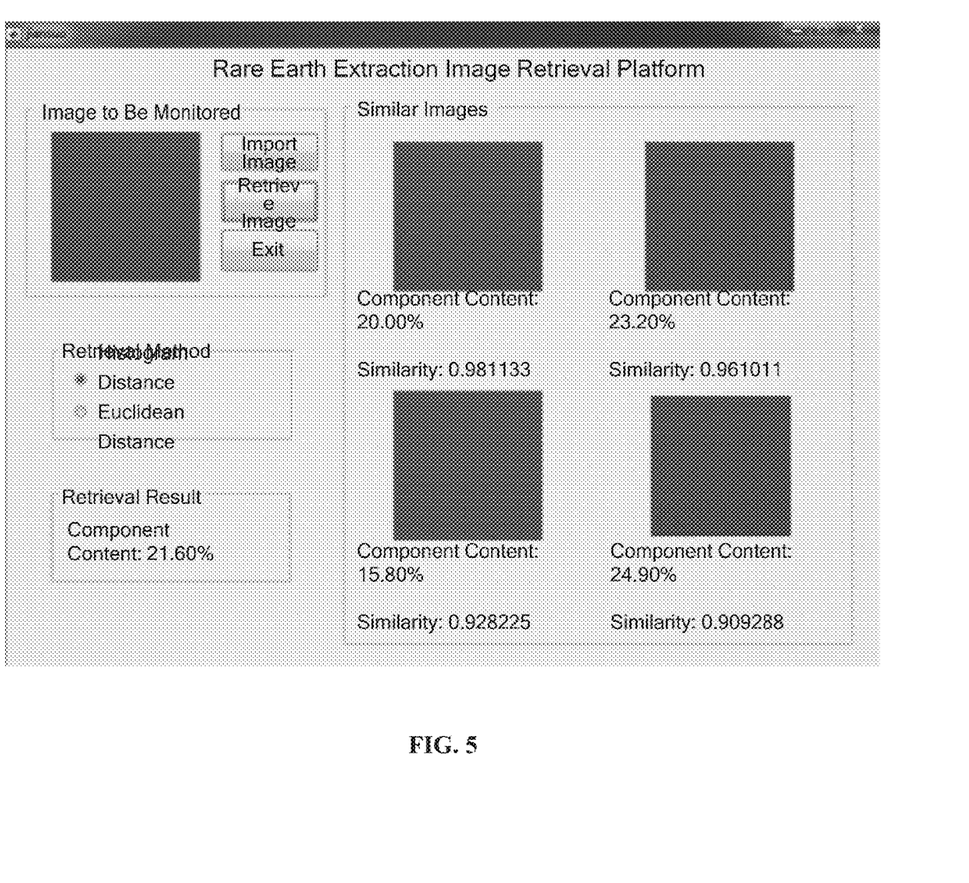
FIG. 5 shows an interface of an image retrieval platform of the system for dynamically monitoring the content of an REE component based on a time-series feature according to the disclosure.

FIGS. 4 and 5 show operating interfaces of a system for dynamically monitoring the content of an REE component based on a time-series feature. The system mainly includes modules such as an image display area, a button control area and an output result area.

In order to test the overall performance of the system, the following experiment was conducted. The laboratory's RE solution image information online acquisition device was used to acquire the time-series images of the RE solution periodically at the monitoring stage of the extraction tank at the Pr/Nd production site of the RE company. The acquisition started at 8 o'clock, and the images were acquired every 30 minutes. By 12:30, 10 sets of images were acquired. The images acquired each time were tested by the monitoring system. Under the optimal working condition, the interval of the component content at the monitoring stage of the extraction section was [87.2,92.2]. The system test results and the component content of the sample solution obtained by the offline test were compared. The test performance is shown in Table 4. It can be seen from Table 4 that after the 10 sets of periodically acquired image test data were input to the monitoring system, the results of the determination of the RE extraction condition were accurate, and the relative errors of the value of the component content output by the image retrieval platform were relatively small. Therefore, the system meets the application requirements of the RE extraction production site, and can realize dynamic monitoring of the content of the REE component.

TABLE 4

Performance Test Results

| Test time | Optimal working condition? | Actual working condition | Image retrieval result (%) | Offline test value (%) | Relative error (%) |
|---|---|---|---|---|---|
| 8:00 | No | No | 81.45 | 82.50 | 1.27 |
| 8:30 | No | No | 81.45 | 80.40 | 1.30 |
| 9:00 | No | No | 86.60 | 85.80 | 0.92 |
| 9:30 | Yes | Yes | — | 89.20 | — |
| 10:00 | Yes | Yes | — | 89.90 | — |
| 10:30 | No | No | 95.3 | 94.60 | 0.73 |
| 11:00 | Yes | Yes | — | 92.20 | — |
| 11:30 | Yes | Yes | — | 91 | — |
| 12:00 | No | No | 97.08 | 96.78 | 0.31 |
| 12:30 | No | No | 97.18 | 96.77 | 0.42 |

According to the specific examples provided by the disclosure, the disclosure discloses the following technical effects.

The disclosure discloses a method for dynamically monitoring the content of an REE component based on a time-series feature. The monitoring method includes: use an image information acquisition device to periodically acquire a time-series image of an RE solution to be monitored; extract a time-series feature of the time-series image in a mixed color space by using a PCA method according to a weight of an HSI color space and a weight of a YUV color space; determine whether a time-series feature value of the time-series image is in an expected interval of the mixed color space, to obtain a determination result; calculate a histogram intersection distance between the time-series image and a sample image in a sample data set in an HSV color space, and determine the content of the REE component corresponding to the time-series image according to a component content corresponding to a sample image with a larger histogram intersection distance, if the determination result indicates no; adjust a process parameter of an RE extraction process according to the content of the REE component corresponding to the time-series image; directly wait for the acquisition of a time-series image at a next sampling time point without determining the component content, if the determination result indicates yes. The monitoring method does not need to calculate the component content according to the time-series image at each acquisition, reducing the calculation amount and calculation time.

Each example of the present specification is described in a progressive manner, each example focuses on the difference from other examples, and the same and similar parts between the examples may refer to each other.

The principles and implementations of the disclosure have been described with reference to specific examples. The description of the above examples is only for facilitating understanding of the method and the core idea of the disclosure, and the described examples are only a part of the examples of the disclosure. All other examples obtained by a person of ordinary skill in the art based on the examples of the disclosure without departing from the inventive scope are the scope of the disclosure.

What is claimed is:

1. A method for dynamically monitoring the content of a rare earth element (REE) component based on a time-series feature, wherein the monitoring method comprises the following steps:
collecting sample solutions in different periods under different working conditions at a rare earth (RE) production site; obtaining a component content of each sample solution through an offline laboratory test; obtaining a sample image of each sample solution through an image information acquisition device; establishing a sample data set that comprises the component content and sample image of each sample solution;
determining a weight of a hue, saturation and intensity (HSI) color space and a weight of a YUV color space for color space fusion based on the sample data set;
determining an expected interval of a mixed color space according to the weight of the HSI color space and the weight of the YUV color space based on the sample data set;
using the image information acquisition device to periodically acquire a time-series image of the RE solution to be monitored;
extracting a time-series feature of the time-series image by using a principal component analysis (PCA) method in the mixed color space according to the weight of the HSI color space and the weight of the YUV color space, to obtain a time-series feature value of the time-series image;

determining whether the time-series feature value of the time-series image is in the expected interval of the mixed color space, to obtain a determination result;

calculating a histogram intersection distance between the time-series image and the sample image in the sample data set in a hue, saturation and value (HSV) color space, determining the content of the REE component corresponding to the time-series image according to a component content corresponding to a sample image with a larger histogram intersection distance, returning to the step of "using the image information acquisition device to periodically acquire a time-series image of the RE solution to be monitored", and waiting for the acquisition of a time-series image at a next sampling time point, if the determination result indicates no; and returning to the step of "using the image information acquisition device to periodically acquire a time-series image of the RE solution to be monitored", and waiting for the acquisition of a time-series image at a next sampling time point, if the determination result indicates yes.

2. The method for dynamically monitoring the content of an REE component based on a time-series feature according to claim 1, wherein the determining a weight of an HSI color space and a weight of a YUV color space for color space fusion based on the sample data set specifically comprises:

converting the sample image of each sample solution from a red, green and blue (RGB) color space to the HSI color space and the YUV color space, to obtain a sample image of each sample solution in the HSI color space and a sample image thereof in the YUV color space;

performing feature extraction on the sample image in the HSI color space and the sample image in the YUV color space respectively through the PCA method to obtain a feature value of the sample image of each sample solution in the HSI color space and a feature value of the sample image of each sample solution in the YUV color space;

performing least squares fitting (LSF) on the feature value of the sample image of each sample solution in the HSI color space and the feature value of the sample image of each sample solution in the YUV color space with the component content of each sample solution respectively, to obtain a relationship model between the HSI color space feature value and the component content and a relationship model between the YUV color space feature value and the component content;

using the relationship model between the HSI color space feature value and the component content and the relationship model between the YUV color space feature value and the component content respectively to determine a feature value interval corresponding to a component content interval under an optimal working condition as an expected interval in the HSI color space and as an expected interval in the YUV color space;

determining a working condition of the sample solution by using the feature value of the sample image of each sample solution in the HSI color space and the feature value of the sample image of each sample solution in the YUV color space based on the expected interval in the HSI color space and the expected interval in the YUV color space respectively, to obtain an accuracy of the determination based on the HSI color space and an accuracy of the determination based on the YUV color space; and normalizing the accuracy of the determination based on the HSI color space and the accuracy of the determination based on the YUV color space respectively, to obtain a normalized accuracy of the determination based on the HSI color space and a normalized accuracy of the determination based on the YUV color space, which serve as a weight of the HSI color space and a weight of the YUV color space, respectively.

3. The method for dynamically monitoring the content of an REE component based on a time-series feature according to claim 1, wherein the determining an expected interval of a mixed color space according to the weight of the HSI color space and the weight of the YUV color space based on the sample data set specifically comprises:

converting the sample image of each sample solution from the RGB color space to the HSI color space and the YUV color space, to obtain a sample image of each sample solution in the HSI color space and a sample image thereof in the YUV color space;

fusing the sample image in the HSI color space and the sample image in the YUV color space according to an image fusion formula $$\begin{cases} \mu_{MIX-1} = \mu_{HSI-H} \\ \mu_{MIX-2} = \mu_{HSI-S} \\ \mu_{MIX-3} = \dfrac{[W_{HSI} \times \mu_{HSI-I} + W_{YUV} \times \mu_{YUV-Y}]}{W_{HSI} + W_{YUV}} \end{cases}$$

based on the weight of the HSI color space and the weight of the YUV color space, to obtain a sample image in the mixed color space;

wherein, $\mu_{MIX-1}$, $\mu_{MIX-2}$ and $\mu_{MIX-3}$ respectively represent a value of a first-order moment of a hue component, a saturation component and a value component in the mixed color space; $\mu_{HSI-H}$, $\mu_{HSI-S}$ and $\mu_{HSI-I}$ respectively represent a value of a first-order moment of H, S and I components in the HSI color space; $\mu_{YUV-Y}$ represents a value of a first-order moment of a Y component in the YUV color space;

$$\mu_x = \frac{1}{N} \sum_{y=1}^{N} P_{xy},$$

wherein $P_{xy}$ represents a value of a first-order moment of an x-th component of a y-th pixel in the image; x is equal to HSI-H, HSI-S, HSI-I and YUV-Y; N represents a number of pixels in the sample image; $W_{HSI}$ and $W_{YUV}$ respectively represent the weight of the HSI color space and the weight of the YUV color space;

performing feature extraction on the sample image in the mixed color space through the PCA method to obtain a feature value of the sample image of each sample solution in the mixed color space;

performing LSF on the feature value of the sample image of each sample solution in the mixed color space with the component content of the sample solution, to obtain a relationship model between the mixed color space feature value and the component content; and using the relationship model between the mixed color space feature value and the component content to determine a feature value interval corresponding to a component content interval under an optimal working condition as an expected interval in the mixed color space.

4. The method for dynamically monitoring the content of an REE component based on a time-series feature according to claim 1, wherein the extracting a time-series feature of the time-series image by using a PCA method in the mixed color space according to the weight of the HSI color space and the weight of the YUV color space, to obtain a time-series feature value of the time-series image specifically comprises:
   converting the time-series image from the RGB color space to the HSI color space and the YUV color space, to obtain a time-series image in the HSI color space and a time-series image in the YUV color space;
   fusing the time-series image in the HSI color space and the time-series image in the YUV color space according to an image fusion formula based on the weight of the HSI color space and the weight of the YUV color space, to obtain a time-series image in the mixed color space;
   performing feature extraction on the time-series image in the mixed color space through the PCA method to obtain a time-series feature value of the time-series image.

5. The method for dynamically monitoring the content of an REE component based on a time-series feature according to claim 1, wherein the calculating a histogram intersection distance between the time-series image and the sample image in the sample data set in a HSV color space, and determining the content of the REE component corresponding to the time-series image according to a component content corresponding to a sample image with a larger histogram intersection distance specifically comprises:
   combining a hue component, a saturation component and a value component of the HSV color space of the time-series image into a one-dimensional (1D) feature vector according to $G(i)=16H_i+4S_i+V_i$, to obtain an quantization index of each pixel of the time-series image, wherein G(i) represents a quantization index of an i-th pixel of the time-series image; $H_i$, $S_i$ and $V_i$ respectively represent a hue component, a saturation component and a value component of the HSV color space of the i-th pixel of the time-series image;
   calculating a histogram intersection distance between the time-series image and each image sample in the sample data set according to $$\rho(G, G'_j) = \sum_{i=1}^{N} \sqrt{G(i)G'_j(i)}$$

based on the quantization index of each pixel of the time-series image, wherein $\rho(G, G_j')$ represents a histogram intersection distance between the time-series image and a j-th sample image in the data sample set; N represents a number of pixels in the time-series image; $G_j'(i)$ represents a quantization index of an i-th pixel of the j-th sample image in the sample data set; and
   calculating an average value of the component content of an image sample with a larger histogram intersection distance as the content of the REE component of the time-series image.

6. The method for dynamically monitoring the content of an REE component based on a time-series feature according to claim 1, wherein before extracting a time-series feature of the time-series image by using a PCA method in the mixed color space according to the weight of the HSI color space and the weight of the YUV color space, to obtain a time-series feature value of the time-series image, the monitoring method further comprises:
   performing background segmentation, filtering and center area extraction on the time-series image to obtain a processed time-series image.

* * * * *